United States Patent [19]

Orita et al.

[11] 4,427,873
[45] Jan. 24, 1984

[54] METHOD AND APPARATUS FOR ALIGNING AXES OF ASSISTING GAS NOZZLES WITH LASER BEAM AXES IN LASER PROCESSING MACHINES

[75] Inventors: Naoki Orita, Fullerton; Toshiyuki Matsumoto, Irvine, both of Calif.

[73] Assignee: Amada Engineering & Service Co., La Mirada, Calif.

[21] Appl. No.: 359,302

[22] Filed: Mar. 18, 1982

[51] Int. Cl.³ .............................................. B23K 27/00
[52] U.S. Cl. ....................... 219/121 LK; 219/121 LL; 219/121 FS
[58] Field of Search ................. 219/121 LL, 121 LK, 219/121 FS, 121 EH, 121 EZ, 121 PM, 121 PQ, 121 PU Primary Examiner—C. L. Albritton
Attorney, Agent, or Firm—Wigman & Cohen

[57] ABSTRACT

A method of and apparatus for aligning the axis of an assisting gas nozzle with a laser beam axis using a test piece in apparatus which uses a laser to process workpieces is disclosed in which the laser beam is arranged to pass through the assisting gas nozzle, and pierce the test piece. The test piece is held by a holder which includes a pressure detector which measures the pressure of the assist gas flowing through the hold pierced in the test piece. The assisting gas nozzle is adjusted in a plane perpendicular to the axis of the laser beam to obtain a maximum pressure value, which indicates that the axis of the assisting gas nozzle and the axis of the laser beam are in alignment with each other.

9 Claims, 11 Drawing Figures

METHOD AND APPARATUS FOR ALIGNING AXES OF ASSISTING GAS NOZZLES WITH LASER BEAM AXES IN LASER PROCESSING MACHINES

BACKGROUND OF THE INVENTION

1. Field of the Invention

The present invention relates to laser processing machines for processing sheet-like workpieces, such as sheet metal, by various methods such as cutting and piercing by the use of laser beams produced by laser resonators.

More particularly, the present invention relates to a method of and an apparatus for aligning the axes of the assisting gas nozzles, which jet out an assisting gas toward the workpieces, with the laser beam axes in such laser processing machines.

2. Description of the Prior Art

Laser beams are widely used in industry to process a variety of metallic and nonmetallic materials such as iron, nickel, plastic, rubber and glass. In laser processing, the laser beam is produced by a laser resonator and is applied, together with an assisting gas such as oxygen gas ($O_2$), to a material to be processed. The laser beam is applied to the material after being focussed by a condensing lens.

In a laser processing machine which processes workpieces by emitting a laser beam and simultaneously jetting out the assisting gas as mentioned above, it is necessary, in order to perform stabilized laser processing (cutting, etc.), that the optical axis of the laser beam (laser beam axis) and the center axis of the assisting gas nozzle (nozzle axial center) be in alignment. However, since the mechanism of an optical system of a laser beam and that of the nozzle system of the assisting gas in the laser processing machine must be made independent of each other, the axis of the assisting gas nozzle is not always aligned with the laser beam axis during machine operation. In the prior art, therefore, it was necessary that an operator observe a workpiece processed during a test operation and align the axis of an assisting gas nozzle with a laser beam axis. This procedure is very time consuming, involves considerable handling and effort, and depends heavily upon the skill of the operator.

SUMMARY AND OBJECTS OF THE INVENTION

In view of the foregoing, it should be apparent that there still exists a need in the art for a method of and apparatus for aligning the axis of the assisting gas nozzle with the laser beam axis in a laser processing machine which obviates the problems noted above.

It is therefore a primary object of the present invention to provide a method of and apparatus for automatically aligning the axis of the assisting gas nozzle with the laser beam axis.

More particularly, it is an object of the present invention to provide apparatus for exactly adjusting the assisting gas nozzle in the planes perpendicular to the laser beam axis so as to align the axis of the assisting gas nozzle with the laser beam axis.

It is a further object of the present invention to provide an apparatus which can detect whether the laser beam axis and the axis of the assisting gas nozzle are properly aligned.

Briefly described, these and other objects of the invention are accomplished in accordance with its apparatus aspects by providing a processing head for an apparatus for processing workpieces with a laser beam in which the laser beam is configured to pass through an assist gas nozzle. The assist gas nozzle is adjustable in a plane perpendicular to the axis of the laser beam. A test piece, held by a test piece holder, is placed in the path of the laser beam below the assist gas nozzle. The test piece holder includes pressure detector means for detecting the pressure of the assist gas flowing through the hole pierced in the test piece by the laser beam.

In its method aspects, after the test piece is pierced, the invention contemplates the sequential steps of detecting the pressure of the assist gas flowing through the hole pierced in the test piece and then adjusting the assisting gas nozzle in a plane perpendicular to the axis of the laser beam until the detected pressure of the assist gas is at a maximum value; thus indicating an alignment condition between the laser beam and the assist gas nozzle.

In an alternate method, once the maximum pressure position has been determined, the invention contemplates moving the assisting gas nozzle a predetermined horizontal distance away from the maximum pressure position, in opposite directions, to determine two pressure values. These pressure values are then averaged and the assisting gas nozzle is adjusted, again in a plane perpendicular to the laser beam axis, until the detected pressure equals the calculated average pressure. At this position, the assisting gas nozzle and the laser beam are aligned.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
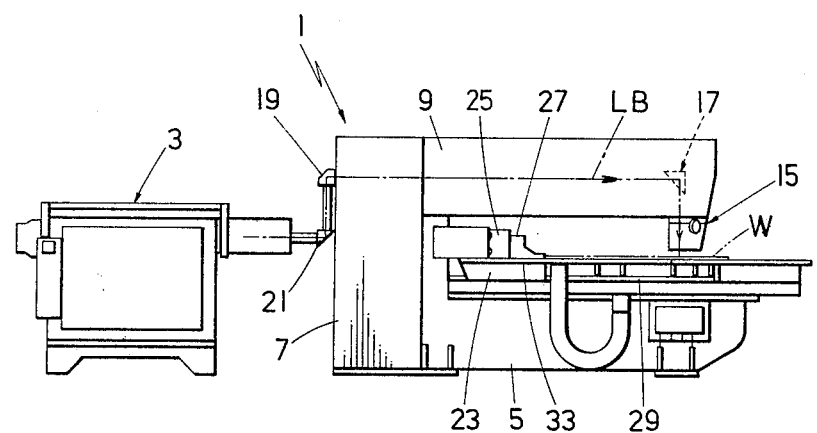
FIG. 1 is a side elevational view of a laser processing machine of the present invention.
Figure 2:
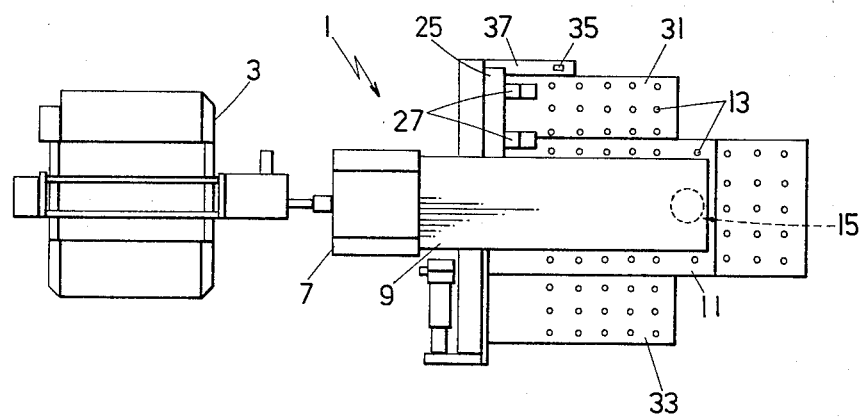
FIG. 2 is a plan view of the laser processing machine shown in FIG. 1.

Referring now in detail to the drawings wherein like parts are designated by like reference numerals throughout, there is shown in FIGS. 1 and 2 a laser processing machine which is generally designated by the numeral 1 and is connected with a laser resonator 3 such as a $CO_2$ (carbon dioxide gas) laser resonator. The laser resonator 3 may be a commercially available unit, and it is arranged so as to produce a laser beam LB and deliver it to the laser processing machine 1 as shown by the arrow in FIGS. 1 and 2.

The laser processing machine 1 comprises a base 5, a post 7 vertically formed or fixed to one end of the base 5 and an overhead beam 9 horizontally supported over the base 5 by the post 7 in a cantilever manner. The base 5 is provided at its top with a fixed table 11 having a number of slide balls 13 on which a workpiece W, such as a sheet of metal, is horizontally placed to be processed. The overhead beam 9 is provided at its forward end with a mirror assembly 17. The mirror assembly 17 is provided at its lower end with a processing head assembly 15, which will be described in greater detail hereinafter. The laser processing machine 1 of the above construction is arranged so as to receive the laser beam LB from the laser resonator 3 and apply the laser beam LB to the workpiece W through the processing head assembly 15 as shown by the arrow in order to process the workpiece W. Also, the mirror assembly 17 is arranged to reflect the laser beam LB delivered from the laser resonator 3 toward the workpiece W, and two additional mirror assemblies 19 and 21 are provided to transmit the laser beam LB from the laser resonator 3 to the mirror assembly 17 in the preferred embodiment.

In order to feed and position the workpieces W to be processed, the laser processing machine 1 is provided with a horizontally movable first carriage 23 and a second carriage 25 which holds a plurality of clamping means 27 for clamping the workpiece W and is slidably mounted on the first carriage 23. The first carriage 23 is slidably mounted on a pair of rails 29 which are fixed on the upper portion of the fixed table 11 in parallel with each other so that the table 11 may be moved toward and away from the processing zone just beneath the processing head assembly 15 when driven by power. The second carriage 25 holding the clamping means 27 is mounted on the first carriage 23 so that it may be horizontally moved by power at right angles with the rails 29. The clamping means 27 are detachably and adjustably fixed to the second carriage 25 so that they may be adjusted according to the width of the workpiece W to be processed.

In order to hold the extending ends of the workpiece W, a pair of movable tables 31 and 33, having a number of slide balls 13, may be fixed to the first carriage 23 so that they can be moved together with the workpiece W by the first carriage 23. Furthermore, in order to initially position the workpiece W on the fixed table 11, a retractable stopper means 35 is provided on an arm member 37 which is horizontally fixed to a portion of the laser processing machine 1. Thus, the workpiece W can be initially positioned on the fixed table 11 when it is clamped with its end held in contact with the stopper means 35 by the clamping means 27 which has been placed by the first carriage 23 at the original location near the post 7.

In the above described arrangement, the workpiece W which is gripped by the clamping means 27 can be fed into a position beneath the processing head assembly 15 by moving the first and second carriages 23 and 25 by power. The workpiece W, when positioned just beneath the processing head assembly 15, is pierced and cut by the laser beams LB which are produced by the laser resonator 3. The laser beams LB are delivered by means of the mirror assemblies 17, 19 and 21 and then sent out vertically and downwardly through the processing head assembly 15 together with an assisting gas, such as oxygen. The workpiece W can also be automatically and continuously pierced and cut by moving the first and second carriages 23 and 25 under a programmed numerical control.

Figure 5:
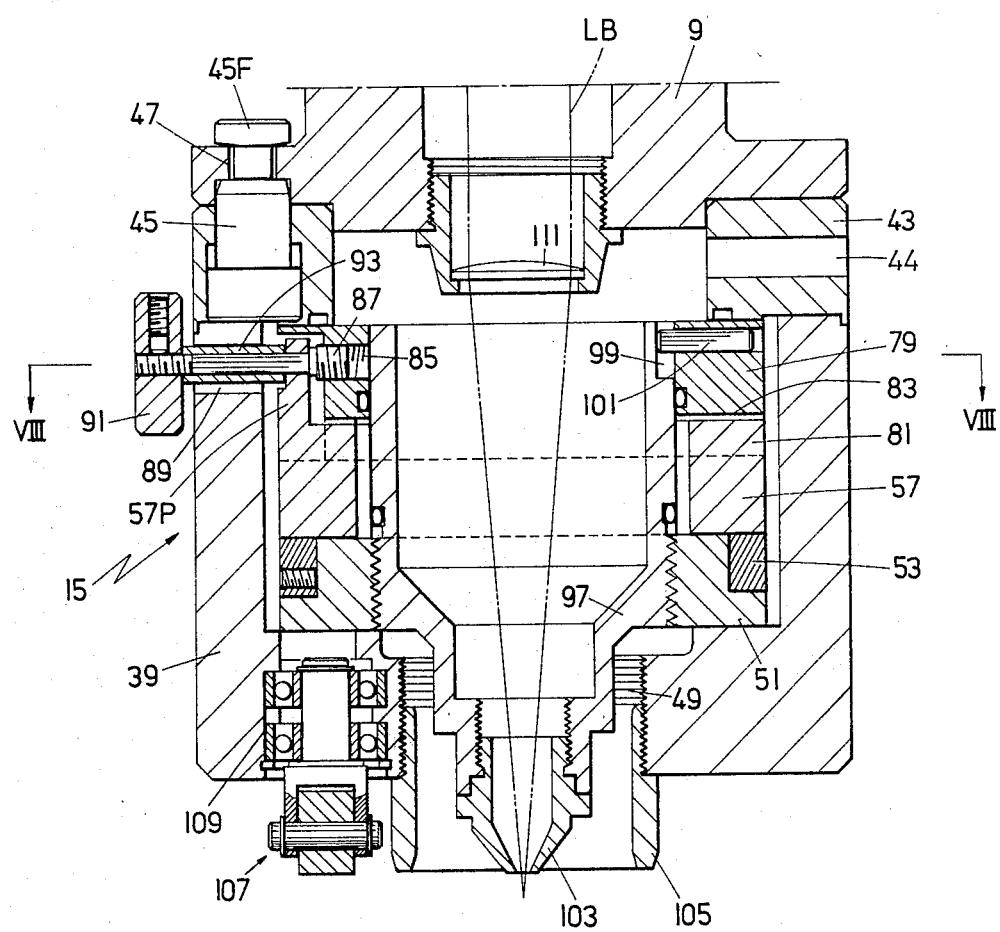
FIG. 5 is a sectional view taken along the line V—V of FIG. 4.
Figure 6:
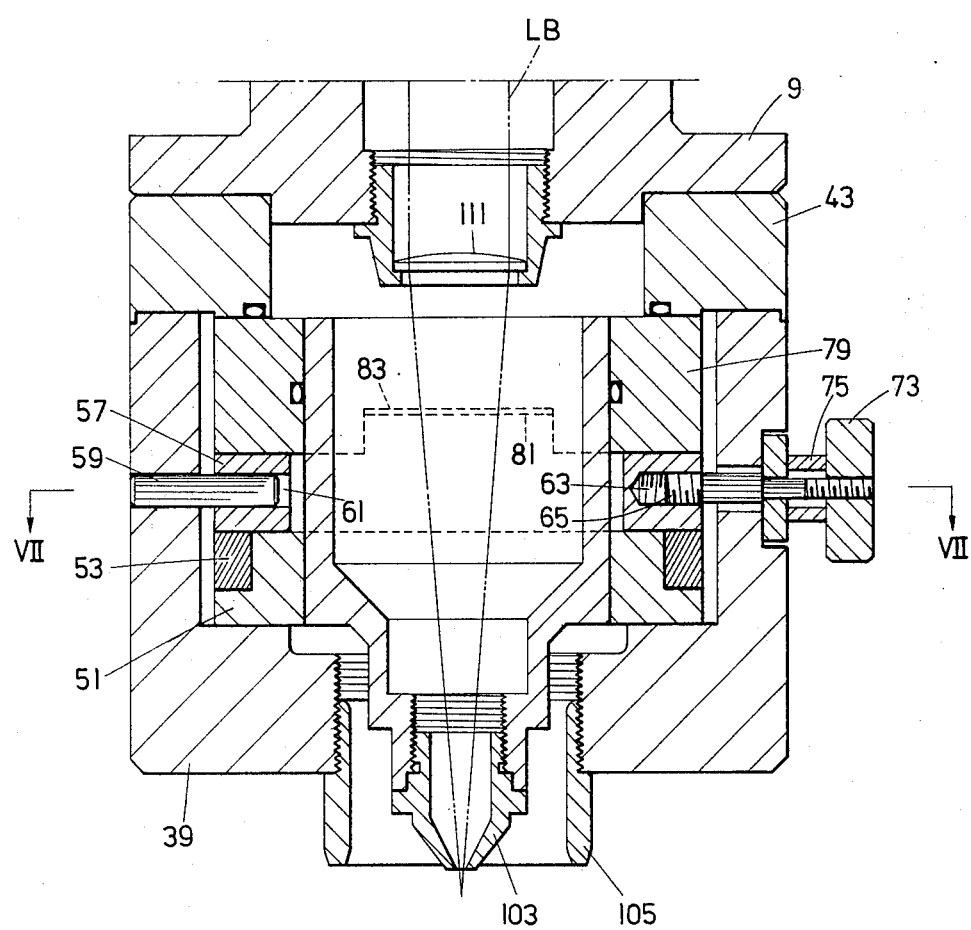
FIG. 6 is a sectional view taken along the line VI—VI of FIG. 4.
Figure 7:
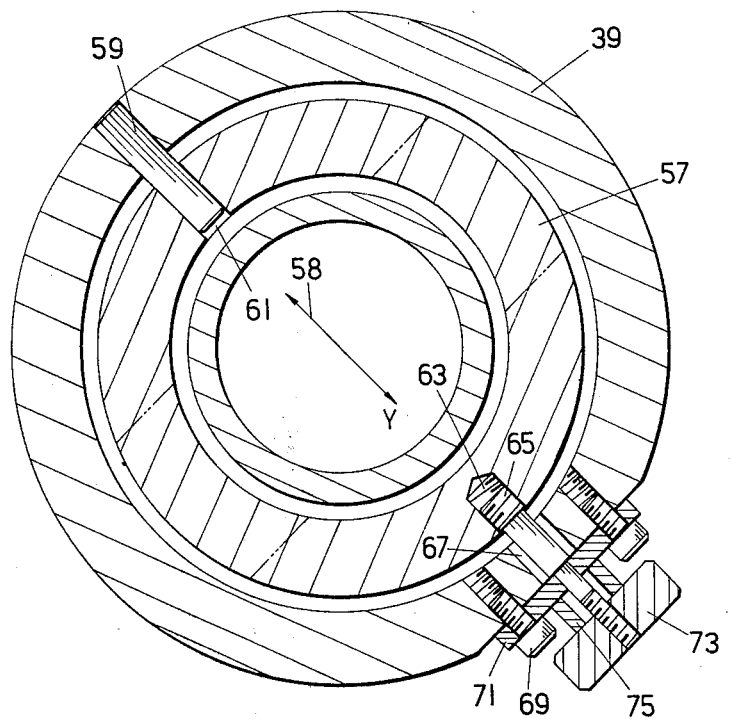
FIG. 7 is a sectional view taken along the line VII—VII of FIG. 6.
Figure 8:
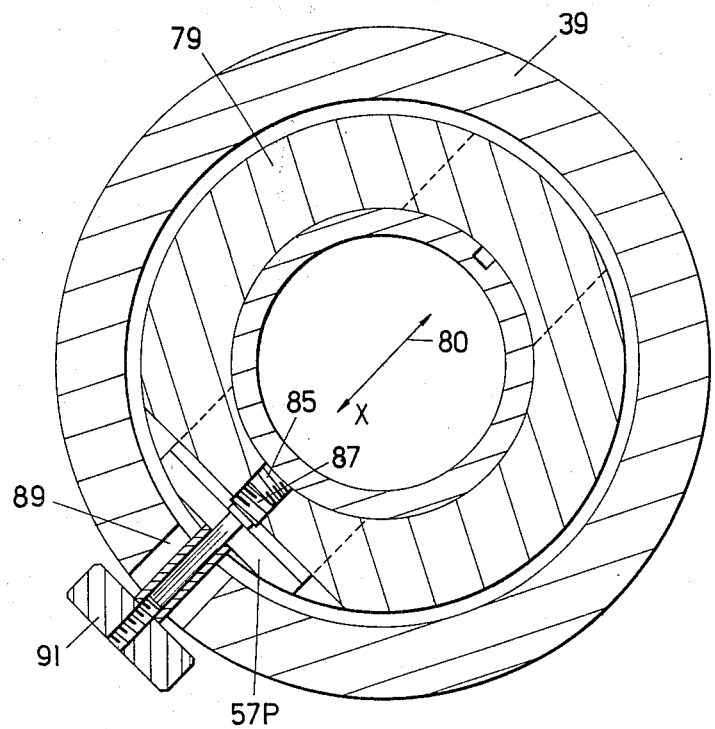
FIG. 8 is a sectional view taken along the line VIII—VIII of FIG. 5.

As shown in FIGS. 3 to 8, the processing head assembly 15 comprises a cylindrical housing 39 and an annular cap member 43 which is fixed securely to the top of the housing 39 by a plurality of bolts 41. An inlet 44 for the assisting gas is contained in the cap member, and it allows the introduction of the assisting gas into the interior of the cap member. The cap member 43 is provided at its top with a plurality of upwardly protruding pins 45 having a flange 45F at their upper portions, respectively. Each pin 45 is fitted, as shown in FIG. 5, in a freely detachable condition, into a plurality of hook holes, each of which is formed into a nearly spoon shape, at the bottom of the leading head of the overhead beam 9. Thus, the processing head assembly 15 is easily detachable from the overhead beam 9.

As shown in FIG. 5, the housing 39 is provided at its bottom center with a penetrant hole 49. This housing 39 incorporates a ring-shaped adjusting nut 51 arranged in a freely rotatable condition. This adjusting nut 51 is provided with a ring-shaped scale 53, which can be easily read through the opening 55, (refer to FIG. 3), provided on the housing 39. At the top of the adjusting nut 51, a Y-axis ring member 57 is mounted which is freely shiftable in the Y-axis direction. As best seen from FIGS. 5, 6 and 7, there is a space between the outer circumferential area of the Y-axis ring member and the inner circumferential area of the housing 39 to allow the position adjustment of the Y-axis ring member 57 in a Y-axis direction 58 (refer to FIGS. 2, 6 and 7).

Figure 3:
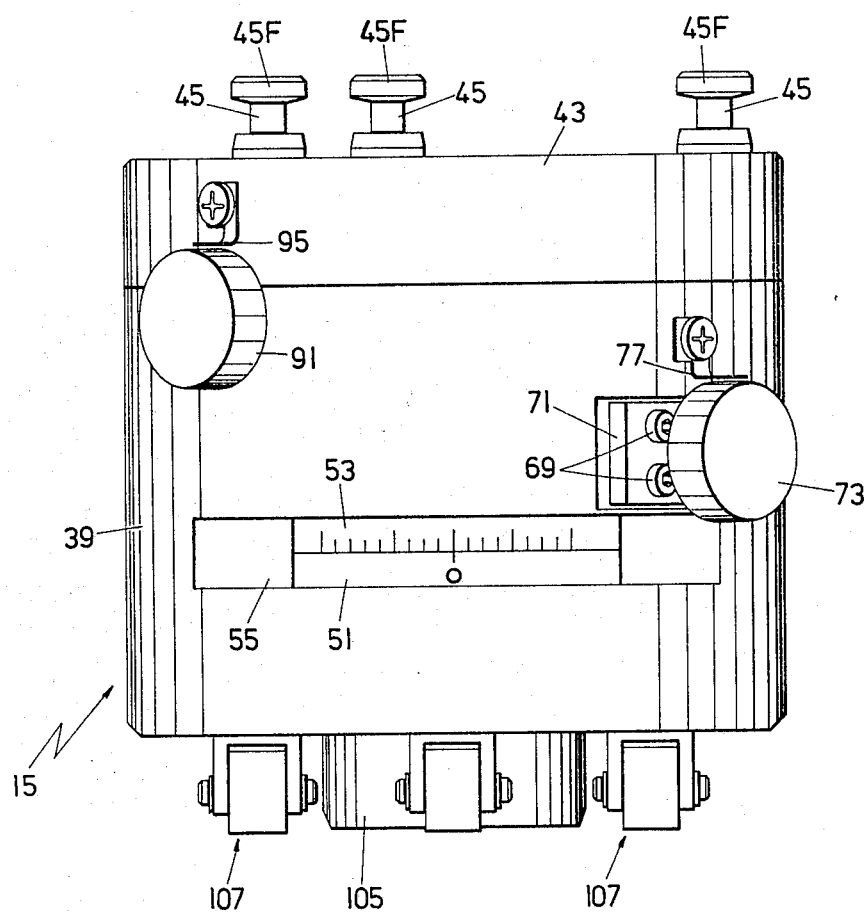
FIG. 3 is a front elevational view of a part of the processing head assembly which shows one embodiment of the present invention.
Figure 4:
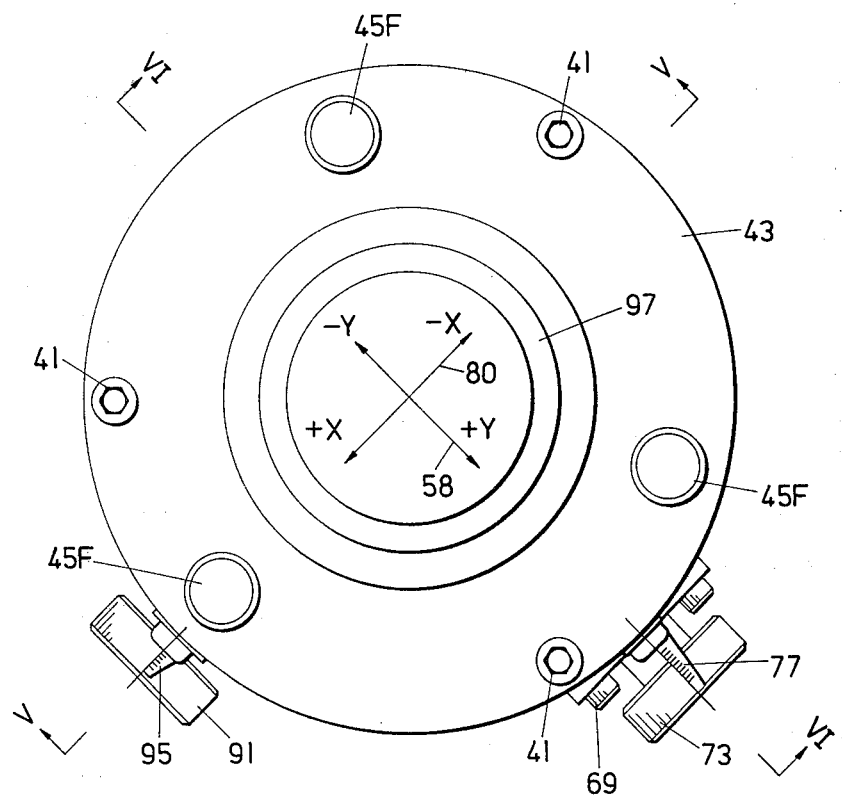
FIG. 4 is a plan view of the processing head assembly shown in FIG. 3.

A guide pin 59, (refer to FIGS. 6 and 7), is fixed securely to the housing 39. This guide pin 59 is fitted into the guide bore 61 of the Y-axis ring member 57. The Y-axis ring member 57 is adjusted in the Y-axis direction 58 by an adjusting member aligning with the guide pin 59, which preferably comprises a Y-axis adjusting bolt 65. One end of the Y-axis adjusting bolt is threadly engaged in the bore 63 in the Y-axis ring member 57. The Y-axis adjusting bolt 65 extends in the Y-axis direction and passes through the hole 67 in housing 39. The Y-axis adjusting bolt 65 is supported in a rotatable state only, at its midway portion, by the washer member 71 which is securely fixed to a counterbore in the housing 39 by means of a plurality of bolts 69. A Y-axis adjusting handle 73 is securely fixed to the outer-end portion of said Y-axis adjusting bolt 65. A collar member 75 is arranged between the Y-axis adjusting handle 73 and the washer member 71. A Y-axis scale 77 is fixed to the housing 39 at a position facing the Y-axis adjusting handle 73, as shown in FIG. 3.

Through the arrangement mentioned above, the rotation of the Y-axis adjusting handle 73 in an appropriate direction will adjust the position of the Y-axis ring member 57 in the Y-axis direction 58. At this time, the Y-axis ring member 57 is guided only in the Y-axis direction 58 due to the relation between the guide pin 59. This allows an accurate position adjustment of the Y-axis ring member 57 in the Y-axis direction 58. The amount of adjustment by the Y-axis ring member 57 in the Y-axis direction can be read by the Y-axis scale 77.

An X-axis ring member 79 is mounted on the top surface of the Y-axis ring member 57. The X-axis ring member 79 is adjustable only in the direction that intersects the position adjusting direction of the Y-axis ring member 57, or in an X-axis direction 80, referring to FIGS. 2, 5 and 8. This can be described in further detail as follows: As seen from FIG. 5 a guide projection 81 is formed on the top face of the Y-axis ring member 57 for guiding the X-axis ring member 79 only in the X-axis direction 80. This guide projection 81 is engaged with a guide groove 83 which is formed at the bottom face of the X-axis ring member 79. Therefore, the X-axis ring member 79 is capable of position adjustment only in the X-axis direction 80. In the Y-axis direction, the X-axis ring member 79 is capable of position adjustment because it forms a single unit with the Y-axis ring member 57.

The top surface of the X-axis ring member 79 slidably contacts the bottom surface of the cap member 43, thereby restraining the upward shifting of the X-axis ring member 79. The X-axis ring member 79 is adjusted in the X-axis direction 80 by an adjusting member which preferably will comprise a X-axis adjusting bolt 87. One end of the X-axis adjusting bolt 87 is threadly engaged in the bore 85 in the X-axis ring member 79. This X-axis adjusting bolt 87 extends in the X-axis direction and is supported, in a rotatable state only, by the projection 57P formed on the upper part of the Y-axis ring member 57. The external end of the X-axis adjusting bolt 87 passes through a slot 89 formed in said housing 39, and protrudes to the outside of the housing 39. An X-axis adjusting handle 91 is fixed to the external end of the X-axis adjusting bolt 87. There is a bushing 93 between this X-axis adjusting handle 91 and said projection 57 P. As shown in FIG. 3, an X-axis scale 95 is fixed to the housing 39 at a position facing the X-axis handle 91. Therefore, by rotating the X-axis adjusting handle 91 in the proper direction, the X-axis member 79 can be position-adjusted with respect to the Y-axis ring member 57 in the X-axis direction. The amount of adjustment of the X-axis ring member 79 in the X-axis direction can be read from the X-axis scale 95.

A cylindrical nozzle holding member 97, which has been formed to have a smaller diameter at its lower portion, is fixed on the internal circumferential surface of the adjusting nut 51 by tapping. The upper part of this nozzle holding member 97 is fitted to the X-axis ring member 79 in a slidable state only in the vertical direction. A key way 99 is formed on the external circumferential surface of the nozzle holding member 97, and a pin 101, which is securely fixed to the X-axis ring member 79, is engaged with the key way 99. The lower part of the nozzle holding member 97 lies in the penetrating hole 49 which is provided at the bottom part of the housing 39. A nozzle 103 is fixed to the lower part of this nozzle holding member 97. Therefore, the nozzle holding member 97 and nozzle 103 can be adjusted upwardly and downwardly by properly rotating the adjusting nut 51 in accordance with the plate thickness of the workpiece W. Thus, the amount of adjustment of the nozzle 103 in the up and down direction can be read from the scale 53.

A protective cylinder, which surrounds the nozzle 103, is fixed in the penetrating hole 49 of the housing 39. The housing 39 is provided at its lower end with a plurality of castor rollers 107, which can roll freely on the surface of workpiece W.

Laser beams LB, which have been vertically refracted by the mirror assembly 17, are focussed by the condenser lens 111 provided on the overhead beam 9 as shown in FIG. 5 and irradiated onto the workpiece W through the nozzle 103. On the other hand, the assisting gas, which has been introduced from the inlet 44 of the cap member 43 into the cap member 43, is jetted out to the workpiece W through the nozzle holding member 97 and nozzle 103, thereby performing work such as melt-cutting of the workpiece W by the laser beams LB. When the laser processing is performed as described above, it is desirable that the axial center of the laser beams LB (hereinafter called the "laser beam axis") be in alignment with the nozzle axial center.

Figure 9:
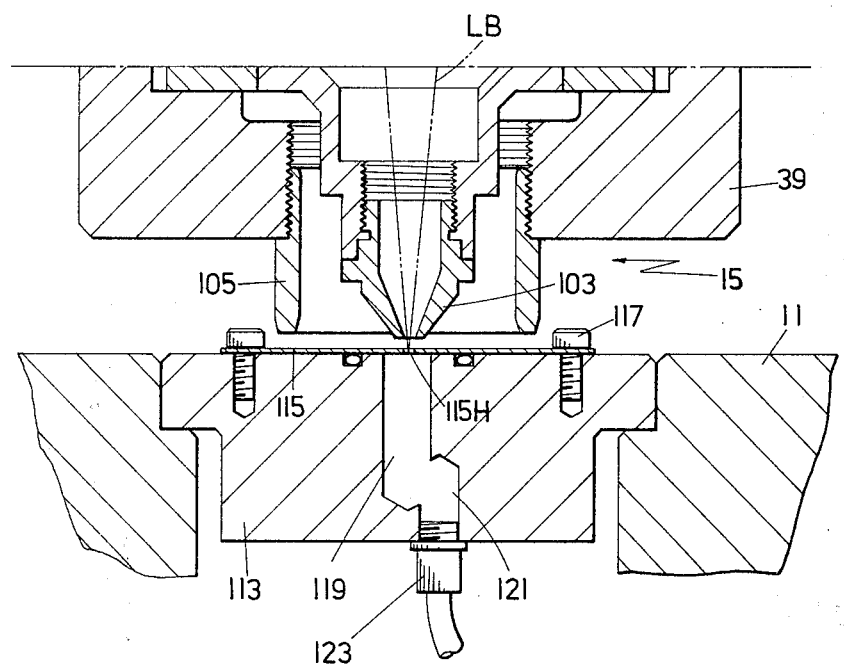
FIG. 9 is a sectional view of the device for detecting an assisting gas pressure together with the part of the processing assembly.

As seen from FIG. 9, means are provided to detect whether the laser beam axis is in alignment or not with the axis of the nozzle 103. Namely, the test piece holding member 113 is mounted, in a freely-detachable state, on the fixed table 11 at the lower position of the processing head assembly 15. A plate-shaped test piece 115 is fixed to the surface of the test piece holding member 113 by a plurality of bolts 117 in a freely-detachable state. A hole 119 is provided at the center of the test piece holding member 113, and a pressure detector 123 is connected to the communicating hole 121 which is provided in continuation to the hole 119. This pressure detector 123 consists of a pressure gauge and a suitable pressure sensor and detects variations of the assisting gas pressure in the hole 119.

The following is an explanation of the operation for detecting whether the laser beam axis is aligned or not with the axial center of the nozzle 103 in the above-described configuration.

First, laser beams LB are momentarily irradiated on the test piece 115 to pierce a small hole 115H on the test piece 115; simultaneously, the assisting gas is jetted from nozzle 103. The X-axis adjusting handle 91 is operated to adjust the position of the nozzle 103 in the X-axis direction 80 by moving the X-axis ring member 79 while the assisting gas is being jetted from the nozzle. Then, pressure variation in the hole 119 due to the assisting gas flowing from the small hole 115H of the test piece 115 into the hole 119, is continuously detected by the pressure detector 123. This serves to detect the position at which the maximum pressure Pm can be obtained by adjusting the position of the nozzle 103 in the X-axis direction 80. At the position where the maximum pressure Pm is detected, the position adjustment of the nozzle 103 in the X-axis direction 80 is stopped.

Next, the Y-axis adjusting handle 73 is operated to adjust the position of the nozzle 103 in the Y-axis direction 58, thereby detecting the position where the pressure of the assisting gas in the hole 119 reaches a maximum. Through these operations, the laser beam axis is aligned with the axis of the nozzle 103.

Figure 10:
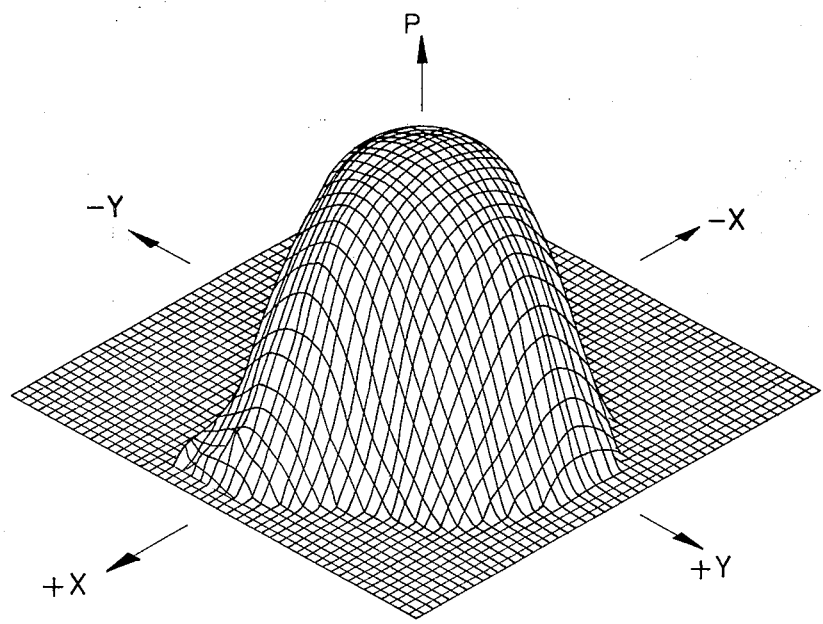
FIG. 10 is a graphic illustration of the pressure distribution condition of the assisting gas.

Thus, since the laser beam axis and the small hole 115H pierced on the test piece 115 are coaxial, this alignment can be achieved when the nozzle 103 is position-adjusted in the X-axis and Y-axis directions 80, 58, and the axial center of the small hole 115H is aligned with that of the nozzle 103. As seen from FIG. 10, when an examination is made of the pressure distribution with respect to the deviation between the axis of the nozzle 103 and the axis of the small hole 115H, a pressure distribution resembling the paraboloid of revolution with the alignment point of both the axes as an apex is observed. Therefore, the adjusting operation of the nozzle 103 is achieved by detecting the position of the maximum pressure in the hole 119.

Figure 11:
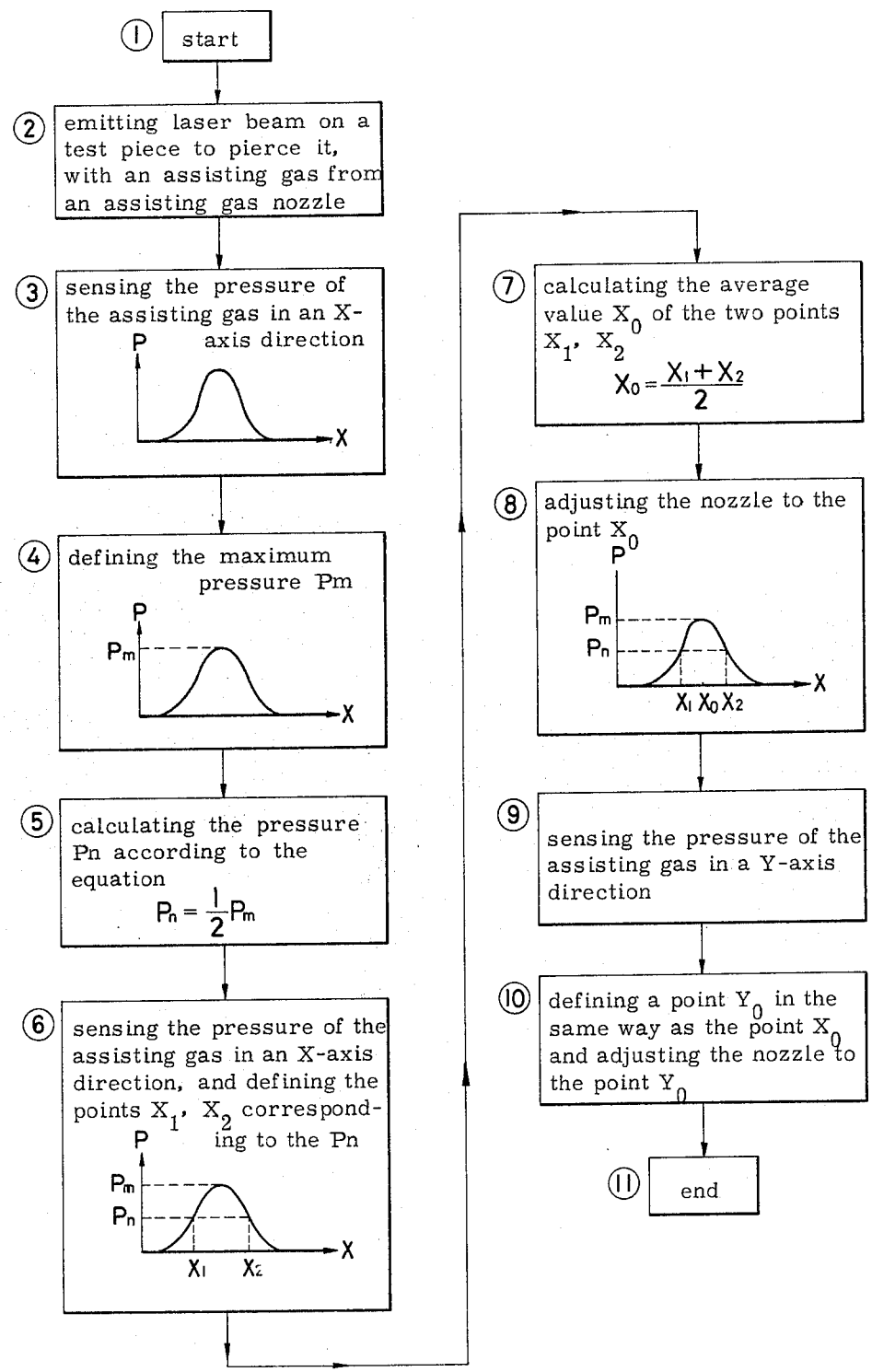
FIG. 11 is a flow chart showing the method of a second embodiment of the present invention.

The above explanation of the preferred embodiment of the present invention is concerned with the alignment between the laser beam axis and the axial center of the nozzle 103 by manual operation. However, if the X-axis and Y-axis adjusting handles 91 and 73 are replaced by the use of drive means such as motors, the adjusting operation can be accomplished automatically. Also, another method can be adopted in which two points showing the pressure value Pn, a fraction of the maximum pressure, are detected and the nozzle 103 is set to the position of an average value of the two points, as shown in the flow chart of FIG. 11.

As can be understood from the explanation of the preferred embodiment of the present invention mentioned above, the present invention can very easily align the laser beam axis with the axial center of the nozzle.

Although a preferred form of the present invention has been illustrated and described, it should be understood that the device is capable of modification by one skilled in the art without departing from the principles of the invention. Accordingly, the scope of the invention is to be limited only by the claims appended hereto.

What is claimed is:

1. A method for aligning the axis of an assisting gas nozzle with a laser beam axis using a test piece in apparatus which uses a laser to process workpieces, comprising the following steps, in sequence:
   piercing the test piece by laser beam emissions;
   jetting assisting gas from the assisting gas nozzle to the test piece;
   detecting the pressure of the assisting gas flowing through the pierced test piece by means of a pressure detector; and
   adjusting the assisting gas nozzle in a plane perpendicular to the axis of the laser beam until the detected pressure of the assisting gas flowing through the pierced test piece reaches a maximum value at a maximum position,
   whereby the axis of the assisting gas nozzle will be in alignment with the axis of the laser beam.

2. The method of claim 1, further including the steps of:
   adjusting the assisting gas nozzle to a first position a predetermined distance away in said plane perpendicular to the axis of the laser beam from said maximum position;
   detecting the pressure of said assisting gas flowing through said pierced test piece at said first position;
   adjusting the assisting nozzle to a second position an equal distance but horizontally opposite direction away in said plane perpendicular to the axis of the laser beam from said maximum position;
   detecting the pressure of said assisting gas flowing through said pierced test piece at said second position;
   calculating the average pressure detected at said first and second positions; and
   adjusting the assisting gas nozzle in said plane perpendicular to the axis of the laser beam until the detected pressure equals the calculated average pressure.

3. Apparatus for aligning the axis of an assist gas nozzle with a laser beam axis in an apparatus which uses a laser to process workpieces, comprising:
   an assist gas nozzle arranged so as to pass the laser beam;
   means for adjusting the assist gas nozzle in a plane perpendicular to the axis of the laser beam;
   a test piece arranged to be pierced by the laser beam;
   test piece holding means for detachably holding said test piece; and
   pressure detector means contained in said test piece holding means for detecting the pressure of the assist gas flowing through the test piece pierced by the laser beam.

4. The apparatus of claim 3, wherein the adjusting means is comprised on an X-axis adjusting means and a Y-axis adjusting means, the X-axis being perpendicular to the Y-axis in a plane perpendicular to the axis of the laser beam.

5. The apparatus of claim 4, wherein the X-axis adjusting means includes an X-axis adjusting bolt and an X-axis ring member for operating said X-axis adjusting means.

6. The apparatus of claims 4 and 5, wherein the Y-axis adjusting means includes a Y-axis adjusting bolt and a Y-axis ring member for operating said Y-axis adjusting means.

7. The apparatus of claim 3 wherein said pressure detector means includes a pressure gauge and a pressure sensor.

8. The apparatus for claim 3, further including processing head assembly means attached to said apparatus for directing said laser beam at said test piece which is positioned beneath said processing head assembly means.

9. The apparatus of claim 8, wherein said pressure detector means is positioned opposite said processing head assembly means.

* * * * *